US010997467B1

(12) United States Patent
Alsallakh et al.

(10) Patent No.: US 10,997,467 B1
(45) Date of Patent: May 4, 2021

(54) VISUAL ANALYTICS EXPOSURE OF IMAGE OBJECT DETECTOR WEAKNESS

(71) Applicant: Robert Bosch GmbH, Stuttgart (DE)

(72) Inventors: Bilal Alsallakh, Sunnyvale, CA (US); Nanxiang Li, San Mateo, CA (US); Lincan Zou, San Jose, CA (US); Axel Wendt, Ostfildern (DE); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 16/657,587

(22) Filed: Oct. 18, 2019

(51) Int. Cl.
*G06K 9/62* (2006.01)
*G06T 11/00* (2006.01)
*G06T 5/50* (2006.01)

(52) U.S. Cl.
CPC ............. *G06K 9/6262* (2013.01); *G06T 5/50* (2013.01); *G06T 11/001* (2013.01); *G06T 2207/20212* (2013.01)

(58) Field of Classification Search
CPC ......... G06K 9/626; G96T 5/50; G96T 11/001; G96T 2207/20212
See application file for complete search history.

(56) References Cited

U.S. PATENT DOCUMENTS

| 2013/0169686 A1* | 7/2013 | Saunders | G09G 5/00 345/634 |
|---|---|---|---|
| 2015/0169994 A1* | 6/2015 | Chinen | G06K 9/0055 382/218 |
| 2018/0165829 A1 | 6/2018 | Hong et al. | |

OTHER PUBLICATIONS

Johnson-Roberson et al., Driving in the Matrix: Can Virtual Worlds Replace Human-Generated Annotations for Real World Tasks?, Institute of Electrical and Electronics Engineers (IEEE) International Conference on Robotics and Automation (ICRA), pp. 1-8, May 2017.
Richter et al., Playing for Benchmarks, Institute of Electrical and Electronics Engineers (IEEE) International Conference on Computer Vision (ICCV), pp. 2232-2241, Oct. 2017.
Richter et al., Playing for Data: Ground Truth From Computer Games, European Conference on Computer Vision (ECCV), pp. 102-118, Oct. 2016.
Shah et al., AirSim: High-Fidelity Visual and Physical Simulation for Autonomous Vehicles, 11th Conference on Field and Service Robotics, Sep. 2017.
Dosovitskiy et al., CARLA: An Open Urban Driving Simulator, 1st Annual Conference on Robotic Learning (CoRL), pp. 1-16, Oc.t 2017.

(Continued)

*Primary Examiner* — Michelle L Sams
(74) *Attorney, Agent, or Firm* — Brooks Kushman P.C.

(57) ABSTRACT

Weaknesses may be exposed in image object detectors. An image object is overlaid onto a background image at each of a plurality of locations, the background image including a scene in which the image objects can be present. A detector model is used to attempt detection of the image object as overlaid onto the background image, the detector model being trained to identify the image object in background images, the detection resulting in background scene detection scores indicative of likelihood of the image object being detected at each of the plurality of locations. A detectability map is displayed overlaid on the background image, the detectability map including, for each of the plurality of locations, a bounding box of the image object illustrated according to the respective detection score.

20 Claims, 10 Drawing Sheets

(56) References Cited

OTHER PUBLICATIONS

Sakaridis et al., Semantic Foggy Scene Understanding With Synthetic Data, International Journal of Computer Vision (IJCV), pp. 1-20, 2018.

Alcorn et al., Strike (with) a Pose: Neural Networks are Easily Fooled by Strange Poses of Familiar Objects, arXiv preprint arXiv:1811.11553, 2018.

Wang et al., High-Resolution Image Synthesis and Semantic Manipulation With Conditional Gains, Institute of Electrical and Electronics Engineers (IEEE) Conference on Computer Vision and Pattern Recognition (CVPR), pp. 8798-8807, Jun. 2018.

Zhang et al., DeepRoad: GAN-Based Metamorphic Autonomous Driving System Testing, arXiv:1802.02295v2 [cs.SE], Mar. 7, 2018.

Ouyang et al., Pedestrian-Synthesis-GAN: Generating Pedestrian Data in Real Scene and Beyond, arXiv:1804.02047v2 [cs.CV] Apr. 14, 2018.

Georgakis et al., Synthesizing Training Data for Object Detection in Indoor Scenes, arXiv:1702.07836v2 [cs.CV] Sep. 8, 2017.

Dwibedi et al., Cut, Paste and Learn: Surprisingly Easy Synthesis for Instance Detection, arXiv:1708.01642v1[cs.CV] Aug. 4, 2017.

Ribeiro et al., Why Should I Trust You? Explaining the Predictions of Any Classifier, arXiv:1602.04938v3 [cs.LG] Aug. 9, 2016.

Zeiler et al., Visualizing and Understanding Convolutional Networks, 13th European Conference on Computer Vision (ECCV), pp. 818-833, Sep. 2014.

Zhou et al., Object Detectors Emerge in Deep Scene CNNs, 3rd International Conference on Learning Representations (ICLR), May 2015.

Kauderer-Abrams, Quantifying Translation-Invariance in Convolutional Neural Networks, arXiv:1801.01450v1 [cs.CV] Dec. 10, 2017.

Cordts et al., The Cityscape Dataset for Semantic Urban Scene Understanding, Institute of Electrical and Electronics Engineers (IEEE) Conference on Computer Vision and Pattern Recognition (CVPR), pp. 3213-3223, Jun. 2016.

Yu et al., BDD100K: A Diverse Driving Video Database with Scalable Annotation Tooling, arXiv:1805.04687v1 [cs.CV] May 12, 2018.

Liu et al., SSD: Single Shot MultiBox Detector, arXiv:1512.02325v5 [cs.CV] Dec. 29, 2016.

Ren et al., Faster R-CNN: Towards Real-Time Object Detection with Region Proposals Networks, arXiv:1506.01497v3 [cs.CV] Jan. 6, 2016.

Behrendt et al., Bosch Small Traffic Lights Dataset, retrieved from <https://github.com/bosch-ros-pkg/bstld> on Jun. 1, 2020.

Mueller et al., Detecting Traffic Lights by Single Shot Detection, International Conference on Intelligent Transportation Systems (ITSC), pp. 266-273, Institute of Electrical and Electronics Engineers (IEEE) 2018, arXiv:1805.02523v3 [cs.CV] Oct. 11, 2018.

Fregin et al., The DriveU Traffic Light Dataset: Introduction and Comparison With Existing Datasets, Institute of Electrical and Electronics Engineers (IEEE) International Conference on Robotics and Automation (ICRA), pp. 3376-3383, May 2018.

Russakovsky et al., ImageNet Large Scale Visual Recognition Challenge, International Journal of Computer Vision, Apr. 2015.

Lin et al., Microsoft COCO: Common Objects in Context, European Conference on Computer Vision (ECCV), pp. 740-755, 2014.

Vondrick et al., HOGgles: Visualizing Object Detection Features, Institute of Electrical and Electronics Engineers (IEEE) International Conference on Computer Vision (ICCV), pp. 1-8, 2013.

Pei et al., DeepXplore: Automated Whitebox Testing of Deep Learning Systems, ACM Symposium on Operating Systems Principles (SOSP), pp. 1-18, Oct. 2017.

Ramanagopal et al., Failing to Learn: Autonomously Identifying Perception Failures for Self-Driving Cars, IEEE Robotics and Automation Letters, arXiv:1707.00051v4 [cs.CV] Jul. 26, 2018.

\* cited by examiner

BSTLD training data distribution

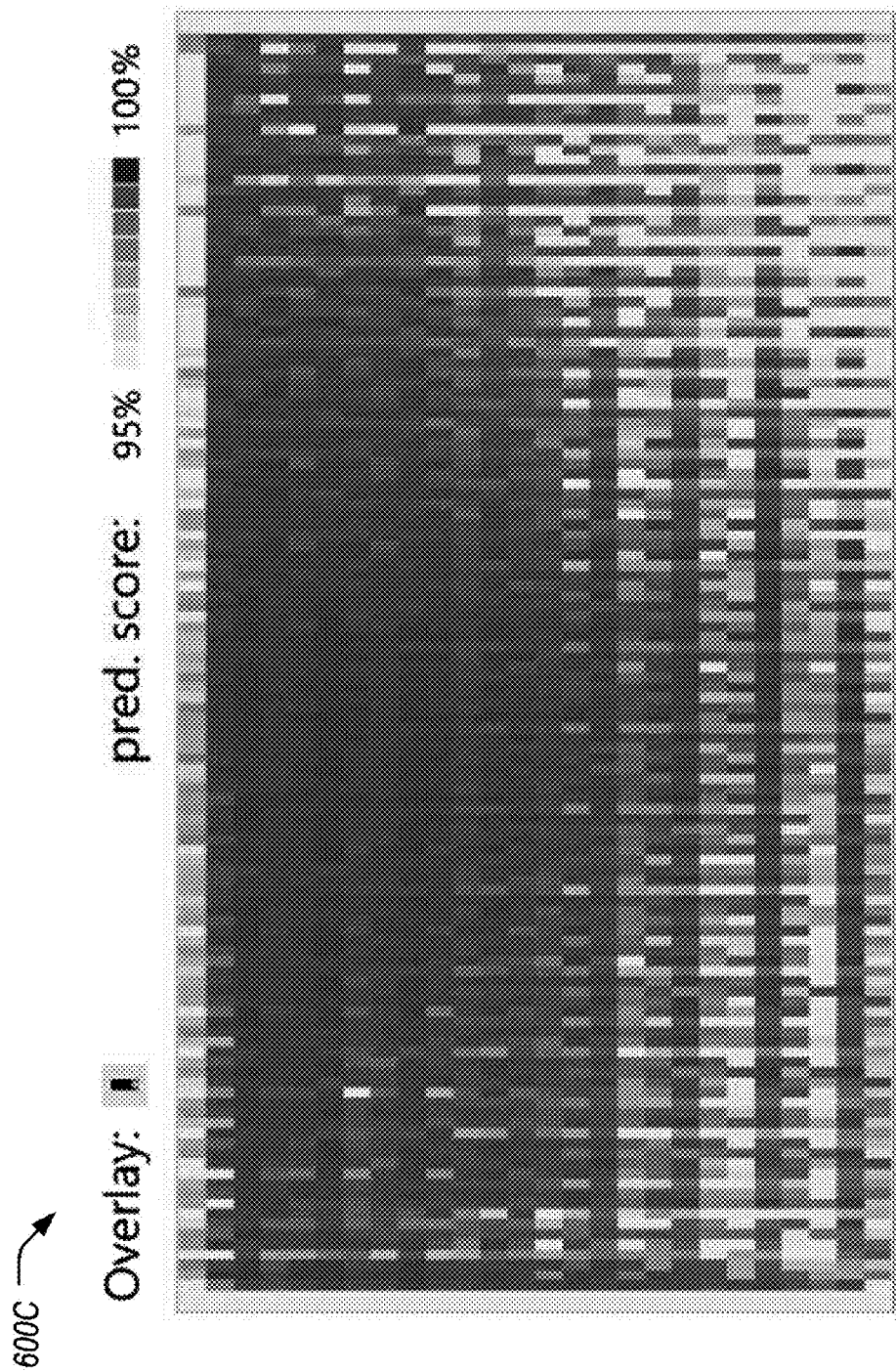

US 10,997,467 B1

VISUAL ANALYTICS EXPOSURE OF IMAGE OBJECT DETECTOR WEAKNESS

TECHNICAL FIELD

This disclosure relates generally to use of visual analytics to expose weaknesses in image object detectors.

BACKGROUND

Synthetic images have been used to evaluate the reliability of models used in autonomous vehicles. Two main approaches have been proposed for this purpose, rendering and generative models.

In a rendering approach, a variety of methods leverage computer games to generate annotated scene data that can be used for training, benchmarking, and creating challenging traffic scenarios (e.g., M. Johnson-Roberson, C. Barto, R. Mehta, S. N. Sridhar, K. Rosaen, and R. Vasudevan, "Driving in the matrix: Can virtual worlds replace human-generated annotations for real world tasks?," *IEEE International Conference on Robotics and Automation (ICRA)*, pages 1-8, 2017; S. R. Richter, Z. Hayder, and V. Koltun, "Playing for benchmarks", *IEEE International Conference on Computer Vision*, (ICCV), pages 2232-2241, 2017; and S. R. Richter, V. Vineet, S. Roth, and V. Koltun. "Playing for data: Ground truth from computer games," *European Conference on Computer Vision (ECCV)*, pages 102-118. Springer, 2016). Dedicated simulators have been developed for this purpose such as AirSim (S. Shah, D. Dey, C. Lovett, and A. Kapoor, "AirSim: High-fidelity visual and physical simulation for autonomous vehicles," Field and Service Robotics, 2017) and CARLA (A. Dosovitskiy, G. Ros, F. Codevilla, A. Lopez, and V. Koltun, "CARLA: An open urban driving simulator," *Annual Conference on Robot Learning*," pages 1-16, 2017). Rendering has further been used to change weather conditions in real scenes such as fog (C. Sakaridis, D. Dai, and L. Van Gool, "Semantic foggy scene understanding with synthetic data," *International Journal of Computer Vision*, pages 1-20, 2018) or to superimpose objects of interest in a variety of poses to evaluate pose invariance (M. A. Alcorn, Q. Li, Z. Gong, C. Wang, L. Mai, W. S. Ku, and A. Nguyen, "Strike (with) a pose: Neural networks are easily fooled by strange poses of familiar objects," arXiv preprint arXiv:1811.11553, 2018).

Regarding generative models, Generative Adversarial Networks (GANs) have opened new possibilities to generate test cases for autonomous driving. For example, they were shown to generate full scene images from a segmentation mask (T. C. Wang, M.-Y. Liu, J.-Y. Zhu, A. Tao, J. Kautz, and B. Catanzaro, "High-resolution image synthesis and semantic manipulation with conditional gains," *IEEE Conference on Computer Vision and Pattern Recognition (CVPR)*, pages 8798-8807, 2018) to simulate weather conditions (M. Zhang, Y. Zhang, L. Zhang, C. Liu, and S. Khurshi, "Deeproad: Ganbased metamorphiim-painc autonomous driving system testing," arXiv preprint arXiv: 1802.02295, 2018) or to introduce pedestrian instances in a real scene (X. Ouyang, Y. Cheng, Y. Jiang, C.-L. Li, and P. Zhou, "Pedestrian-Synthesis-GAN: Generating pedestrian data in real scene and beyond," arXiv preprint arXiv: 1804.02047, 2018).

SUMMARY

According to one or more illustrative examples, a method for exposing weaknesses in image object detectors includes overlaying an image object onto a background image at each of a plurality of locations, the background image including a scene in which the image objects can be present; using a detector model to attempt detection of the image object as overlaid onto the background image, the detector model being trained to identify the image object in background images, the detection resulting in background scene detection scores indicative of likelihood of the image object being detected at each of the plurality of locations; and displaying a detectability map overlaid on the background image, the detectability map including, for each of the plurality of locations, a bounding box of the image object illustrated according to the respective detection score.

According to one or more illustrative examples, a system for exposing weaknesses in image object detectors includes a user interface; a storage configured to maintain a background image, an image object, and a mapping application; and a processor, in communication with the storage and the user interface, programmed to execute the mapping application to perform operations including to overlay the image object onto the background image at each of a plurality of locations, the background image including a scene in which the image objects can be present; use a detector model to attempt detection of the image object as overlaid onto the background image, the detector model being trained to identify the image object in background images, the detection resulting in background scene detection scores indicative of likelihood of the image object being detected at each of the plurality of locations; and display, in the user interface, a detectability map overlaid on the background image, the detectability map including, for each of the plurality of locations, a bounding box of the image object illustrated according to the respective detection score According to one or more illustrative examples, a non-transitory computer-readable medium includes instructions that, when executed by a processor, cause the processor to perform operations for exposing weaknesses in image object detectors including to overlay an image object onto a background image at each of a plurality of locations, the background image including a scene in which the image objects can be present; use a detector model to attempt detection of the image object as overlaid onto the background image, the detector model being trained to identify the image object in background images, the detection resulting in background scene detection scores indicative of likelihood of the image object being detected at each of the plurality of locations; and display, in a user interface, a detectability map overlaid on the background image, the detectability map including, for each of the plurality of locations, a bounding box of the image object illustrated according to the respective detection score.

BRIEF DESCRIPTION OF THE DRAWINGS

FIG. 6C is an example of a detectability map for the Faster R-CNN traffic light detector.

DETAILED DESCRIPTION

Figure 1:
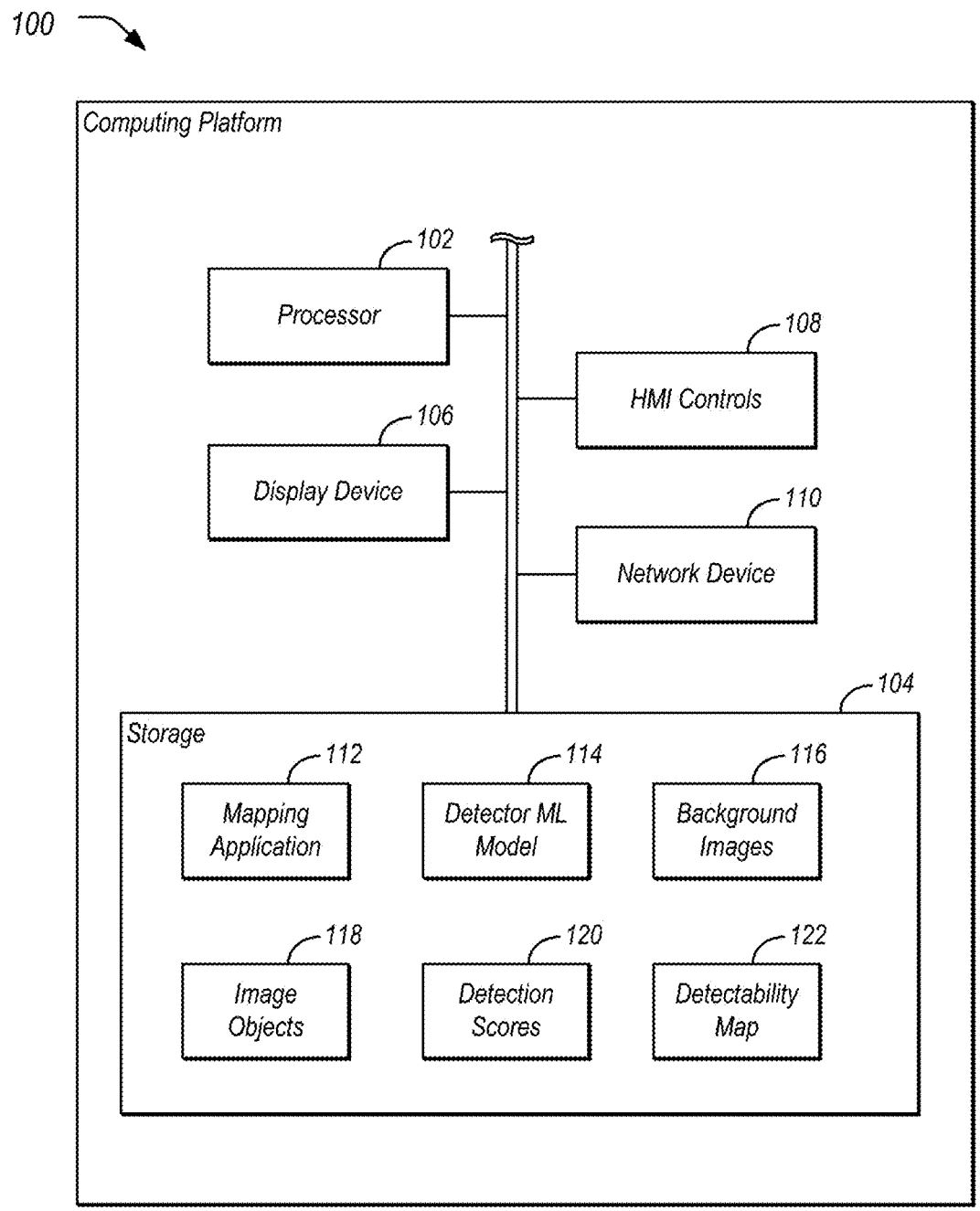
FIG. 1 is a schematic diagram of an exemplary embodiment of a system for using image superimposition techniques to visualize influence of a background image on image detection of an overlaid image object.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Existing methods may be used to expose certain model vulnerabilities. Aside from serving testing purposes, superimposition may be used to augment training data in object detection (G. Georgakis, A. Mousavian, A. C. Berg, and J. Kosecka, "Synthesizing training data for object detection in indoor scenes," arXiv preprint arXiv:1702.07836, 2017; and Owibedi, 0., Misra, I., & Hebert, M, "Cut, paste and learn: Surprisingly easy synthesis for instance detection." *IEEE international conference on computer vision (ICCV)*, 2017). A related family of techniques modify the input image for the purpose of visualizing which image areas are used by a model to compute certain predictions. This has been used in the context of whole image classification (M. T. Ribeiro, S. Singh, and C. Guestrin, "Why should I trust you?: Explaining the predictions of any classifier," ACM SIGKDD *International Conference on Knowledge Discovery and Data Mining*, pages 1135-1144. ACM, 2016; M. D. Zeiler and R. Fergus, "Visualizing and understanding convolutional networks," *European Conference on Computer Vision (ECCV)*, pages 818-833. Springer, 2014; and B. Zhou, A. Khosla, A. Lapedriza, A. Oliva, and A. Torralba, "Object detectors emerge in deep scene CNNs," *International Conference on Learning Representations (ICLR)*, 2015), usually by occluding certain image areas or introducing certain perturbations. Finally, translation invariance has not been analyzed in the context of object detection (E. Kauderer Abrams, "Quantifying translation-invariance in convolutional neural networks," CoRR, abs/1801.01450, 2018).

As described in detail herein, image superimposition techniques are used to visualize influence of a background image on image detection by a detection model of an overlaid image object. Detection scores may be determined for each of the superimpositions, and a detectability map of the detection scores may be constructed for display. As compared to the references identified above, these detectability maps are designed for object detection, not for whole image classification (which is a different task in computer vision). Second, they are computed by introducing object instances in certain image areas, not by occluding these areas with a blank overlay.

FIG. 1 is a schematic diagram of an exemplary embodiment of a system 100 for using image superimposition techniques to visualize influence of a background image 116 on image detection of an overlaid image object 118. The system 100 includes a processor 102 that is operatively connected to a memory 104, a display device 106, human-machine interface (HMI) controls 108, and a network device 110. As described in more detail below, during operation, the system 100 utilizes an image overlayer to iteratively superimpose the image object 118 over various locations of the background image 116, determine detection scores 120 for each of the superimpositions, and construct a detectability map 122 of the detection scores 120 for display.

In the system 100, the processor 102 may include one or more integrated circuits that implement the functionality of a central processing unit (CPU) and/or graphics processing unit (GPU). In some examples, the processor 102 is a system on a chip (SoC) that integrates the functionality of the CPU and GPU. The SoC may optionally include other components such as, for example, the memory 104 and the network device 110 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families. Additionally, alternative embodiments of the processor 102 can include microcontrollers, application specific integrated circuits (ASICs), field programmable gate arrays (FPGAs), digital signal processors (DSPs), or any other suitable digital logic devices.

During operation, the processor 102 executes stored program instructions that are retrieved from non-transitory memory 104. The stored program instructions include software that controls the operation of the processor 102 to perform the operations described herein. The memory 104 may include both non-volatile memory and volatile memory devices. The non-volatile or non-transitory memory includes solid-state memories, such as NAND flash memory, magnetic and optical storage media, or any other suitable data storage device that retains data when the system 100 is deactivated or loses electrical power. The volatile or transitory memory includes static and dynamic random-access memory (RAM) that stores program instructions and data during operation of the system 100.

The GPU may include hardware and software for display of at least two-dimensional (2D) and optionally three-dimensional (3D) graphics to a display device 106. The display device 106 may include an electronic display screen, projector, printer, or any other suitable device that reproduces a graphical display. In some examples, the processor 102 executes software programs using the hardware functionality in the GPU to accelerate the performance of machine learning or other computing operations described herein.

The HMI controls 108 may include any of various devices that enable the system 100 to receive control input from workers or other users. Examples of suitable input devices that receive human interface inputs may include keyboards, mice, trackballs, touchscreens, voice input devices, graphics tablets, and the like.

The network device 110 may include any of various devices that enable the system 100 to send and/or receive data from external devices. Examples of suitable network devices 110 include a network adapter or peripheral interconnection device that receives data from another computer or external data storage device, which can be useful for receiving large sets of data in an efficient manner.

A mapping application 112 may use various algorithms to perform aspects of the operations described herein. In an example, the mapping application 112 may include instructions stored to the memory 104 and executable by the processor 102 as discussed above. Computer-executable instructions may be compiled or interpreted from computer programs created using a variety of programming languages and/or technologies, including, without limitation, and either alone or in combination, Java, C, C++, C#, Visual Basic, JavaScript, Python, Perl, PL/SQL, etc. In general, the processor 102 receives the instructions, e.g., from the memory 104, a computer-readable medium, etc., and executes these instructions, thereby performing one or more processes, including one or more of the processes described herein. Such instructions and other data may be stored and transmitted using a variety of computer-readable media.

In artificial intelligence (AI) or machine learning systems, model-based reasoning refers to an inference method that operates based on a machine learning model 114 of a worldview to be analyzed. Generally, the machine learning model 114 is trained to learn a function that provides a precise correlation between input values and output values. At runtime, a machine learning engine uses the knowledge encoded in the machine learning model 114 against observed data to derive conclusions such as a diagnosis or a prediction. One example machine learning system may include the TensorFlow AI engine made available by Alphabet Inc. of Mountain View, Calif., although other machine learning systems may additionally or alternately be used. As discussed in detail herein, the detector machine learning model 114 may be configured to recognize specific types of objects in graphical images.

Detecting small image objects, such as traffic lights in a street scene, is challenging as a variety of subtleties can impact the detector machine learning model 114. Nevertheless, early object detection is crucial for many applications, such as for robust planning in autonomous driving. In such applications, the objects of interest are at a distance and often appear small in the image space. Yet, standard evaluation practices mainly focus on quantifying the detection performance and provide limited means to understand the reason behind failure cases.

A novel visual analytics approach is proposed that exposes latent weaknesses of small image object detectors, focusing on traffic lights as an exemplary case. This approach may be performed by the system 100, as discussed in detail herein. The approach is based on superimposing instances of image objects 118 at a multitude of locations in different background images 116 and visualizing background objects in these images 116 that systematically interfere with the detector 114. Findings using this approach may be verified on real images that exhibit these patterns. As a result, the approach identifies pitfalls of several traffic light detection models 114 that are not easy to identify from, or might not appear in, existing testing sets. For example, certain models 114 may consistently fail to detect traffic lights in the vicinity of objects containing similar-looking features such as car front or rear parts, or in the vicinity of objects the pre-trained kernel in use happens to be sensitive to. These findings are useful in improving the detection model 114 and to tackle special cases. As a result, the disclosed approaches enable increased test coverage of detectors 114 of image objects 118 beyond the state of the art.

The success of deep neural networks in computer vision tasks has enabled rapid advances in image-based object detection. Image objects 118, such as relatively distant traffic lights in street scenes, still pose a challenging case because the detection model 114 is often more sensitive to image context than in the case of large objects. It is generally hard to understand which image features detection models 114 (e.g., neural networks or other machine learning constructs) rely on for detecting small image objects 118, as the image objects 118 may include only a few pixels. This limits the possibility to understand when and why the detection model 114 fails. For example, a traffic light detector might have an inherent weakness in detecting traffic lights located in certain scene areas.

Standard model 114 evaluation practices mainly involve inspecting performance metrics and do not always reveal such weaknesses. Furthermore, potential weaknesses might not be apparent in the testing set if the testing set does not contain a sufficient number of corresponding cases. To increase the reliability of detectors 114 of image objects 118, it is important to increase the test coverage and to find out, accordingly, whether or not a systematic failure occurs. Such failure cases can often be linked to shortcomings in the detection models 114 or to deficiencies in the training data. Understanding patterns among these cases is essential to address model 114 shortcomings and to guide the costly process of collecting and annotating additional data.

Figure 2:
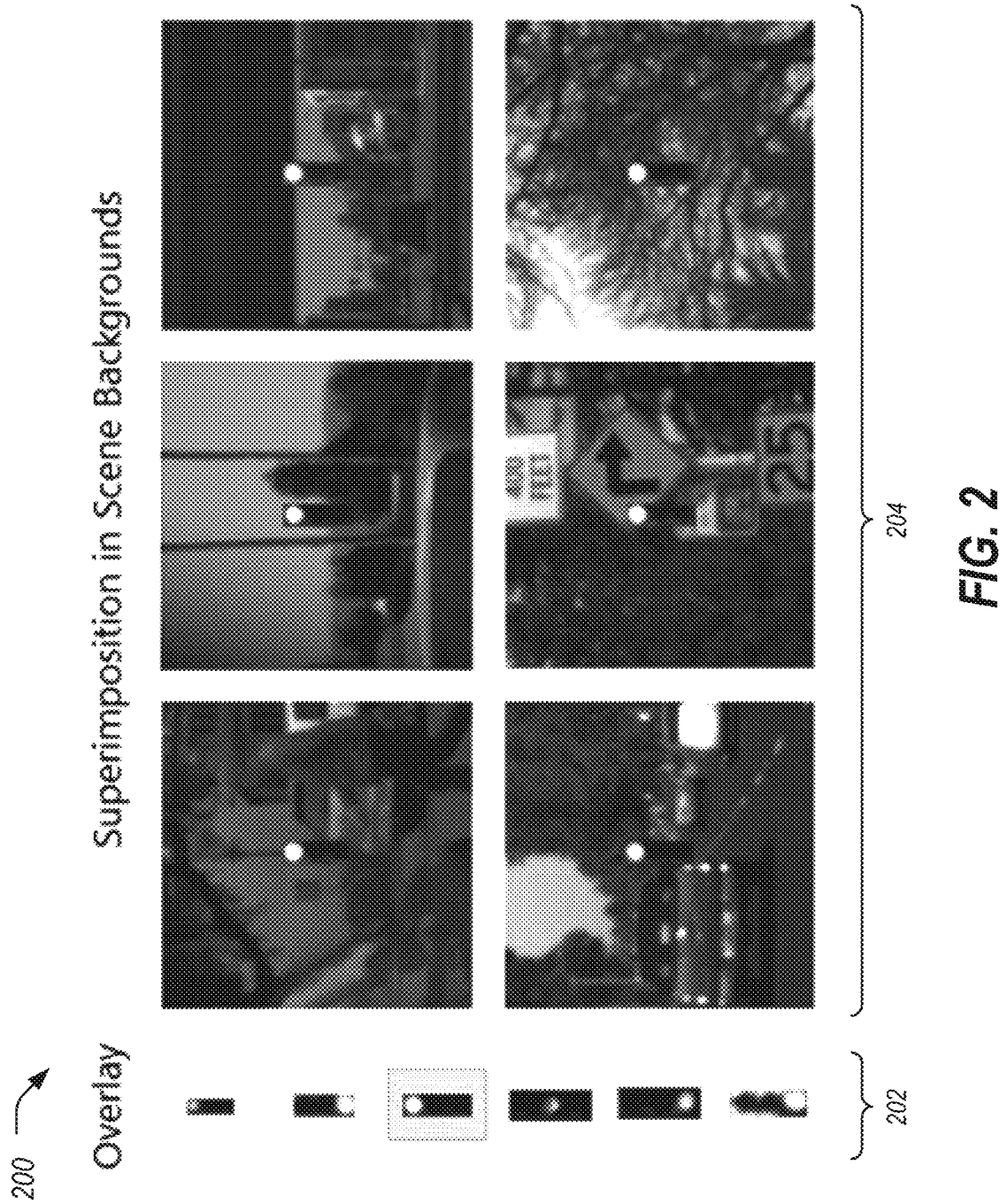
FIG. 2 is an example diagram of introduction of object instances in various image locations.

FIG. 2 is an example diagram of introduction of instances of image objects 118 in various locations of background images 116. Referring to FIG. 2, and with continued reference to FIG. 1, exposing systematic weaknesses of a detection model 114 involving a case-by-case exploration of failure cases is limited because the amount of these cases can be small and the cases might not include all potential failure modes. To expose such weaknesses, the system 100 takes advantage of synthetic data created by artificially introducing instances of image objects 118 in various image locations in a background image 116. This enables the system 100 to find locations and corresponding background objects that repeatedly lead to misdetection errors.

Instead of waiting for potential bugs to surface at runtime, the system 100 may run scripts that generate various test cases, trying to cover as many conceivable scenarios as possible. Similarly, the system 100 tests detectors 114 of image objects 118 under varying conditions by generating a wide range of test cases beyond the ones available in the test set. These additional test cases may be used to measure the effect of the background image 116 on the detection model 114. With respect to the generation of these test images, criteria may be used including that: (i) the test images are generated in a controlled manner to explain any observed effect, and (ii) the test images expose model 114 weaknesses that are likely to happen in real images.

As shown in FIG. 2, an image object 118 from a listing of overlays 202 may be introduced into a background image 116 using image superimposition techniques. For sake of example, the selected element from the overlays 202 is superimposed in the center of each of a set 204 of background images 116. Accordingly, the image object 118 may be introduced as an overlay onto the background image 116.

For instance, a traffic light may be introduced into a street scene. This may be iteratively moved as a sliding window to cover the whole background image 116. A detector 114 may be executed at each location and a detection score 120 may be recorded at each location. For efficient computation, the overlay dimensions may be used as the horizontal and vertical strides. The computation efficiency can be further improved by evaluating the detection score 120 at multiple locations in one run. For instance, the model 114 may be used to determine detection scores 120 for multiple image objects 118 in a single background image 116.

The influence of the background image 116 on the image detection performed by the model 114 may be visualized. In an example, detection scores 120 computed for an overlay of an image object 118 at multiple locations in an image 116 may be used to expose the effect of the content of the background image 116 on detectability of the overlaid image object 118. To visualize this effect, a box may be drawn over each location in the image 116 and the box may be colored according to the computed detection score 120. The resulting image mask of these boxes may be referred to as a detectability map 122. Two modes may be provided to color the boxes of the detectability map 122, namely showing detected locations and showing undetected locations.

Figure 3A:
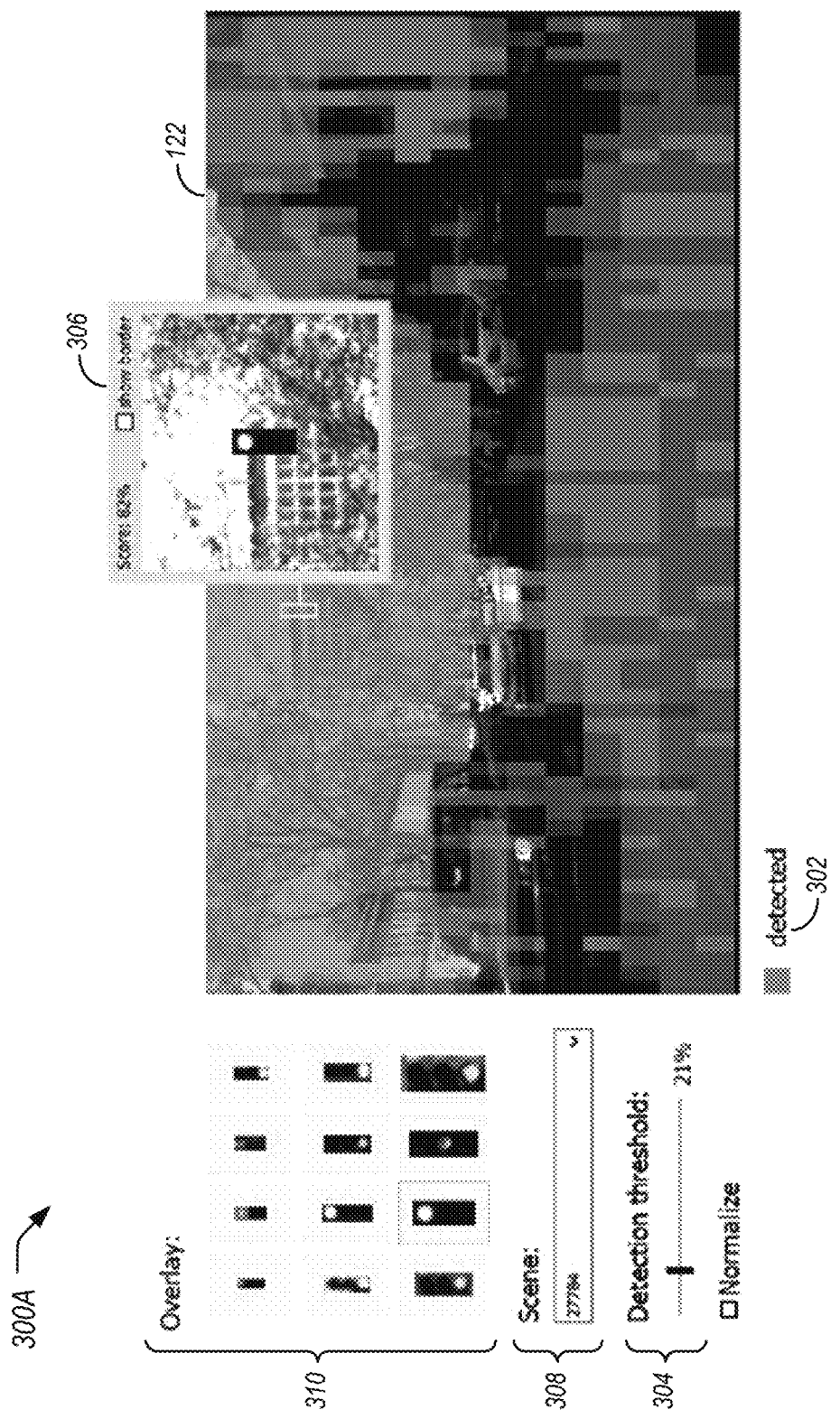
FIG. 3A is an example user interface of a detectability map showing detected locations of an overlay of an object instance at various image locations.

FIG. 3A is an example 300A user interface of a detectability map 122 showing detected locations of an overlay of an image object 118 instance at various image locations. In this first mode, as indicated by the indication 302, shading may be provided when the image object 118 is detected. This may retain areas in the image 116 that are particularly challenging to the detector 114 to be displayed as unshaded.

Figure 3B:
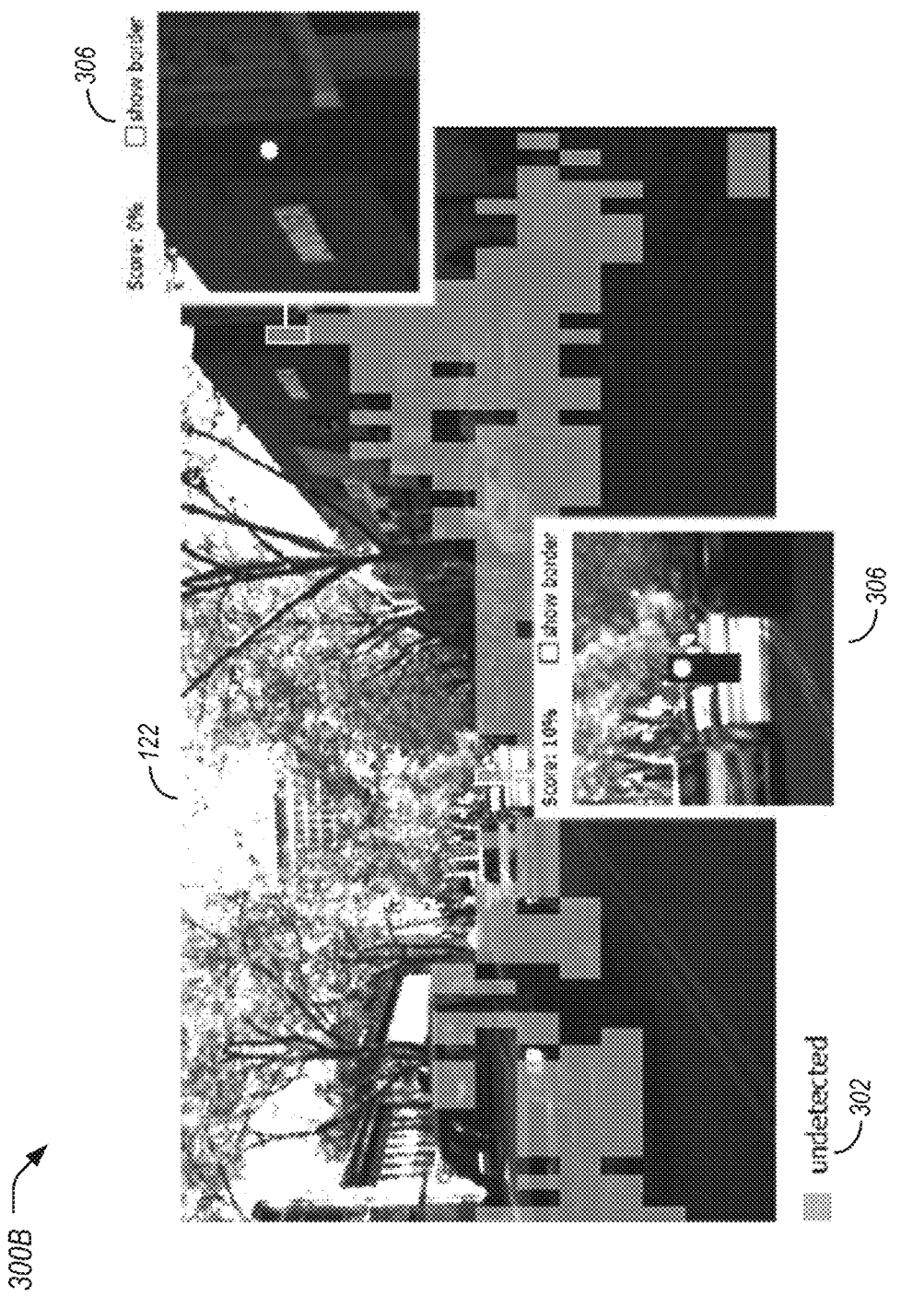
FIG. 3B is an example user interface of a detectability map showing undetected locations of an overlay of an object instance at various image locations.

FIG. 3B is an example 300B user interface of a detectability map 122 showing undetected locations of an overlay of an object instance at various image locations. In this second mode, shading may be provided when the image object 118 is undetected. This may shade the challenging areas and leave areas that are not particularly challenging unshaded.

With continuing reference to FIGS. 3A and 3B, an adjustable detection threshold 304 of the detection score 120 may enable a user to adjust whether the system 100 shades an area as detected or not. In either mode, the shading boxes may be illustrated in the detectability map 122 as semi-transparent to preserve the visibility of the scene context below, with an option to vary the transparency based on the detection score 120. Hovering the mouse over a box may show a panel 306 containing a zoomed view of the original scene area with the introduced image object 118 overlay. This image of the overlay on the original scene may be helpful to examine the raw input processed by the detector 114 at that location and to analyze possible reasons behind low detection scores 120 in certain areas. The maps in FIGS. 3A and 3B may suggest that detectability of traffic lights is impacted when vehicles exist in the background of the overlay. The user may utilize a scene selector dropdown list 308 to inspect other scenes to find out whether or not that is a common pattern. The user interface may also include a listing of overlays 310, to allow the user to see which of the possible image objects 118 was overlaid over the background image 116.

Analyzing interaction patterns with the background image 116 may be performed. Examining multiple image object 118 overlays and background images 116 enables understanding the influence of the background image 116 on the detection model 114 under controlled and interpretable conditions, satisfying the criterion (i) that the images are generated in a controlled manner to explain any observed effect. In particular, the disclosed approach may identify which background objects repeatedly impact the detection of the image object 118. In addition to existing scene objects, the visual properties of the overlaid image object 118 may also influence interaction of the overlaid image object 118 with the background image 116. For example, the brightness properties of the overlay influence which image areas are likely to impact detectability as illustrated in FIGS. 3A and 3B. Similarly, the smaller the overlay, the higher the chance the detector 114 may be affected by the background image 116.

To satisfy the second criterion (ii), namely that the images expose model weaknesses that are likely to happen in real images, the interaction patterns that are predicted to impact detectability are substantiated by corresponding failure cases in real images. In the case of traffic light detection, the detailed annotations in semantic scene segmentation datasets (such as CityScapes (M. Cordts, M. Omran, S. Ramos, T. Rehfeld, M. Enzweiler, R. Benenson, U. Franke, S. Roth, and B. Schiele, "The cityscapes dataset for semantic urban scene understanding," *IEEE Conference on Computer Vision and Pattern Recognition* (*CVPR*), pages 3213-3223, 2016.) and BDD100k (F. Yu, W. Xian, Y. Chen, F. Liu, M. Liao, V. Madhavan, and T. Darrell, "800100k: A diverse driving video database with scalable annotation tooling," arXiv preprint arXiv:1805.04687, 2018.)) may be useful to retrieve scenes in which actual traffic lights have specific objects in the background. Running a traffic light detector on these scenes enables the disclosed approaches to verify the impact of these objects on detectability.

Example finding in traffic light detection may be useful in illustrating aspects of the disclosed approaches. For instance, the disclosed approaches may enable exposing latent weaknesses in three state-of-the-art traffic light detectors referred to herein as traffic light detectors (TD) of TD1, TD2, and TD3. Some relevant specifications of these detectors are illustrated in

TABLE 1

Three example traffic light detection models

| Detection Model | Type | Framework | Kernel | Pre-trained On | Training On |
| --- | --- | --- | --- | --- | --- |
| TD1 | SSD (Custom) | Caffe SSD | Inception V3 | ImageNet | DTLD |
| TD2 | SSD | TensorFlow | MobileNet V1 | MS COCO | BSTLD |
| TD3 | Faster-RCNN | TensorFlow | NASNet-A | MS COCO | BSTLD |

SSD is discussed in Single-Shot Detector (original manuscript at arxiv document 1512.02325v1). Faster R-CNN is discussed in detail in Faster R-CNN: Towards real-time object detection with region proposal networks (N IPS 2016)). TD1 is discussed in K. Behrendt, L. Novak, and R. Botros. Bosch Small Traffic Lights Dataset, available on GitHub under bosch/ros-pkg/bstld. TD2 and TD3 are discussed in J. Mueller and K. Dietmayer, "Detecting traffic lights by single shot detection," *International Conference on Intelligent Transportation Systems (ITSC)*, pages 266-273. IEEE, 2018.

The detectability maps for these three example detectors may be computed for various street scenes from CityScapes (noted above), BSTLD (K. Behrendt, L. Novak, and R. Botros, "A deep learning approach to traffic lights: Detection, tracking, and classification," *IEEE International Conference on Robotics and Automation (ICRA)*, pages 1370-1377. IEEE, 2017), and DTLD (A. Fregin, J. Mueller, U. Krebel, and K. Diermayer, "The driveU traffic light dataset: Introduction and comparison with existing datasets," *IEEE International Conference on Robotics and Automation (ICRA)*, pages 3376-3383. IEEE, 2018). These scenes may exhibit various traffic scenarios and lighting conditions. Multiple image overlays 118 may be used, that are easy to detect by all three detectors 114 against a blank background. In the following, key pitfalls of the detection models 114 that are detected by the disclosed methods are described.

Figure 4:
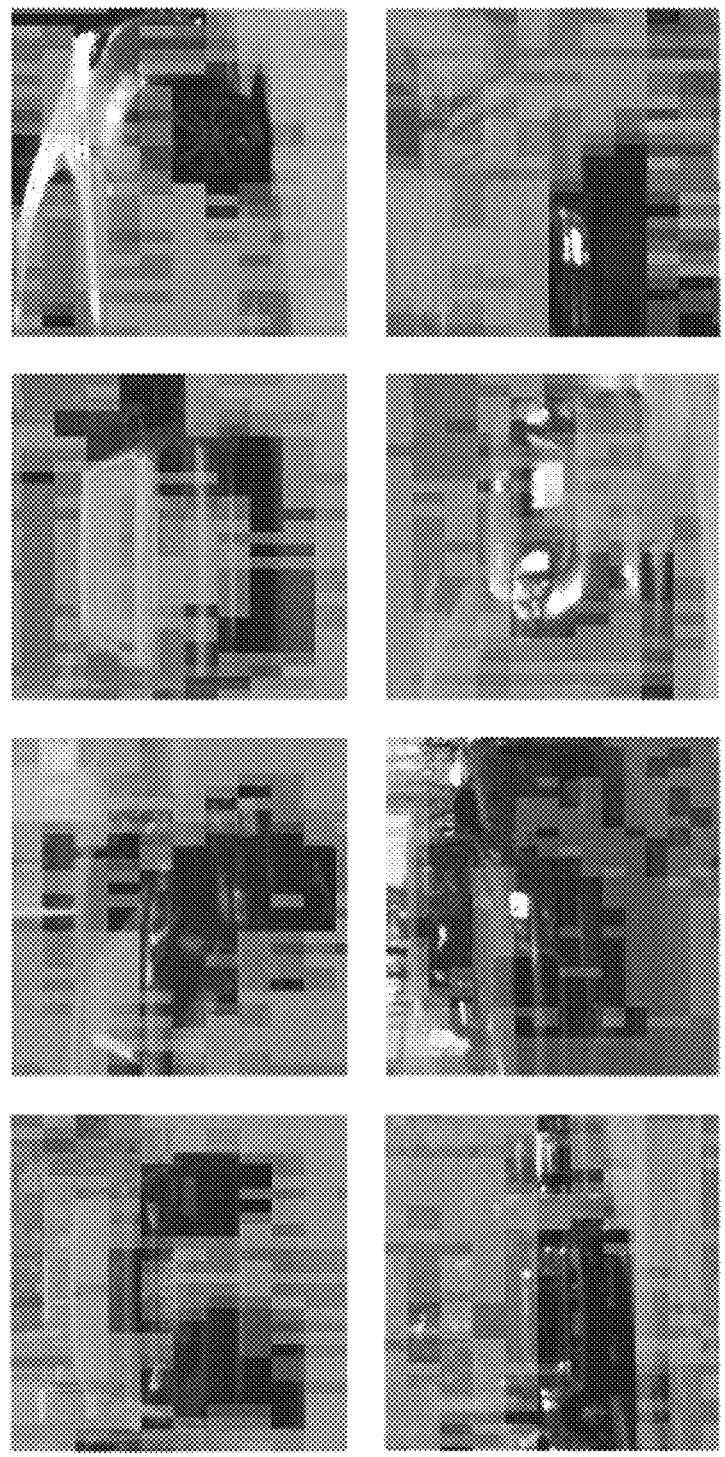
FIG. 4 is an example illustration of the impact of vehicle front or rear parts on the detectability of traffic lights in a scene.

FIG. 4 is an example illustration 400 of the impact of vehicle front or rear parts on the detectability of traffic lights in a scene. A first pitfall that was identified is that car parts can mute the detectors. By examining the maps, a consistent pattern was noted across detectors 114 where an overlay 118 is often undetected if the background object of the overlay 118 is a car. By varying the detection score 120 threshold used for shading the maps, it can be seen in the example illustration 400 that the most challenging areas for detection are the front and rear of the car, in particular around the front and tail lights. These areas have common visual features with red and yellow traffic lights. By closely examining the output of the detectors 114 on various scenes, it can be identified that the detectors 114 rarely compute detection proposals around car lights. Instead, the detection models 114 implicitly learn to exclude car front and tail areas when looking for traffic light image objects 118 in order to reduce the false positive rate during training. This happens even if a proper traffic light image object 118 is superimposed, as the maps reveal. This suggests a potential risk for false negatives: what if a real scene contains a traffic light with car front or tail in the background? A small number of the CityScapes scenes exhibit this overlap. By running the detectors 114 on these scenes, it can be seen that real traffic lights were indeed either undetected altogether, or received a low detection score 120 not explained by partial occlusion.

Accordingly, based on the information indicated by the disclosed approaches, it may be beneficial to pay attention to the special case of image objects 118 overlapping similar-looking objects. Such cases might not appear frequently enough in the training set to influence the learned features, unless the data is augmented with sufficient instances.

Figure 5:
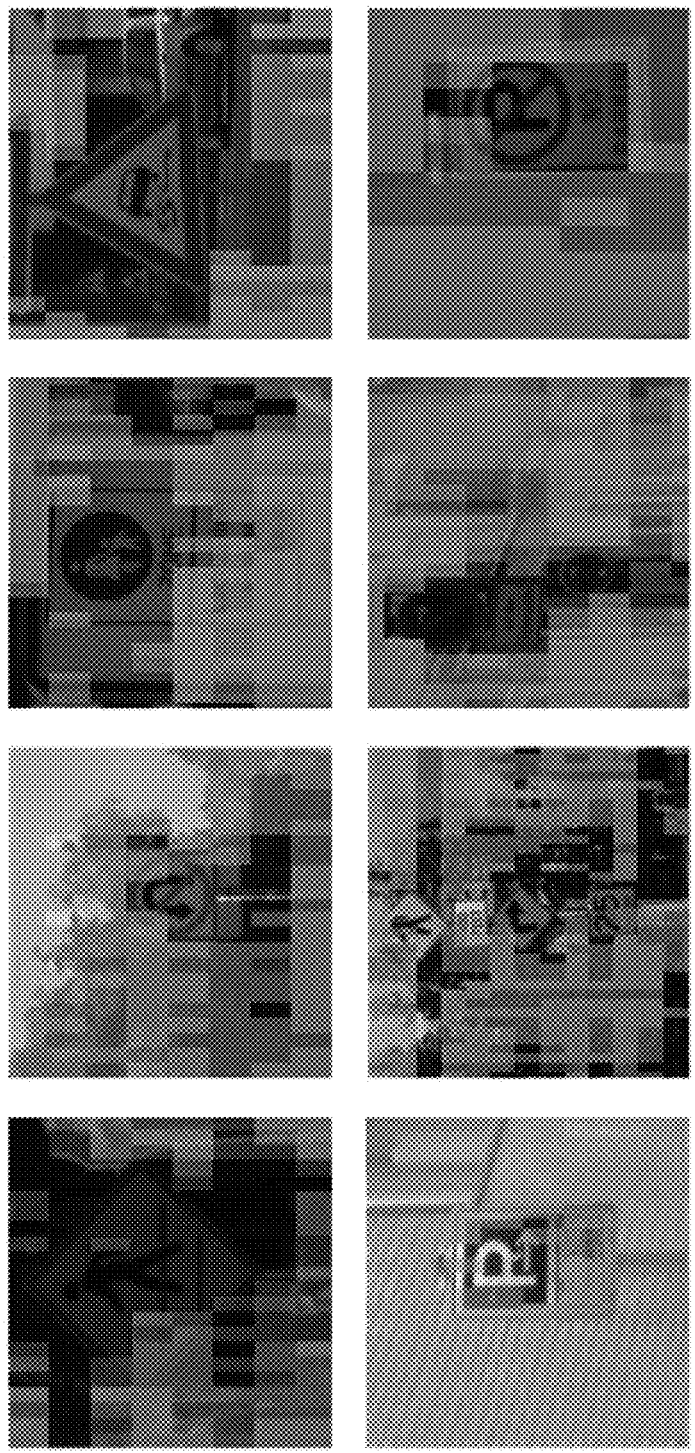
FIG. 5 is an example illustration of the impact of traffic sign presence on the detectability of traffic lights in a scene.

FIG. 5 is an example illustration 500 of the impact of traffic sign presence on the detectability of traffic lights in a scene. A second pitfall that was identified is that pre-trained kernels can confuse the detector 114. It was identified that TD2 and TD3 consistently fail to detect traffic light image overlays 118 when a traffic sign exists in the background as depicted in the example 500. This does not apply to TD1 on the same scenes. By comparing the specification of all detection models 114 as shown in Table 1, it can be seen that each of the traffic light detectors 114 uses a different classification kernel. By comparing the training conditions, it can further be seen that the kernel used in TD1 is pre-trained on ImageNet (O. Russakovsky, J. Deng, H. Su, J. Krause, S. Satheesh, S. Ma, Z. Huang, A. Karpathy, A. Khosla, M. Bernstein, et al, "Image Net large scale visual recognition challenge," *International Journal of Computer Vision*, 115(3):211-252, 2015), while the kernels used in TD2 and in TD3 were pre-trained on Microsoft COCO (Common Objects in Context) (T.-Y. Lin, M. Maire, S. Belongie, J. Hays, P. Perona, D. Ramanan, P. Doll'ar, and C. L. Zitnick, "Microsoft COCO: Common objects in context," *European Conference on Computer Vision (ECCV)*, pages 740-755. Springer, 2014). By examining both datasets, it can be seen that the original version of COCO contains street signs as one of its 91 object categories. On the other hand, Image Net does not contain any category related to street or traffic signs among its 1,000 categories. Accordingly, the kernel in TD1 serves as a generic feature extractor that is fine-tuned to detect traffic light image objects 118. On the other hand, the kernels in TD2 and TD3 are rather specific and more sensitive to traffic signs. This sensitivity persists even after fine-tuning on BSTLD. This dataset, indeed, rarely exhibits overlaps between traffic lights and traffic signs. As expected, TD1 was able to detect them, while TD2 and TD3 were not. The same issue applies to many outdoor categories in COCO such as airplane, bicycle, bird, kite, motorcycle, parking meter, person, and train.

Accordingly, it may beneficial for model developers to examine the object categories their pre-trained kernels are sensitive to and to identify potentially interfering categories with their target objects. Accordingly, the developers may verify whether or not fine-tuning successfully eliminates this interference, both on synthetic and on real images.

Figure 6A:
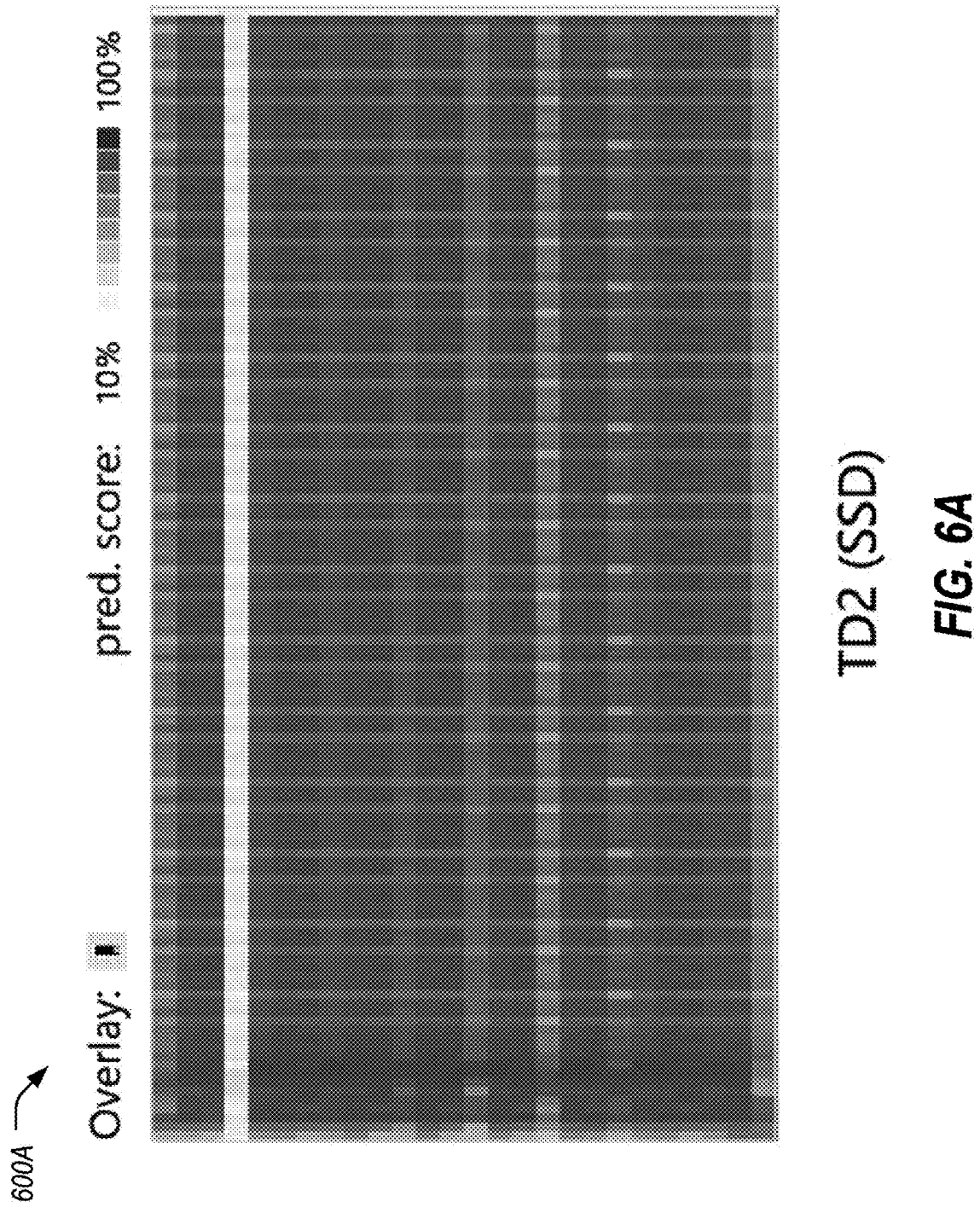
FIG. 6A is an example of a detectability map for the SSD traffic light detector.
Figure 6B:
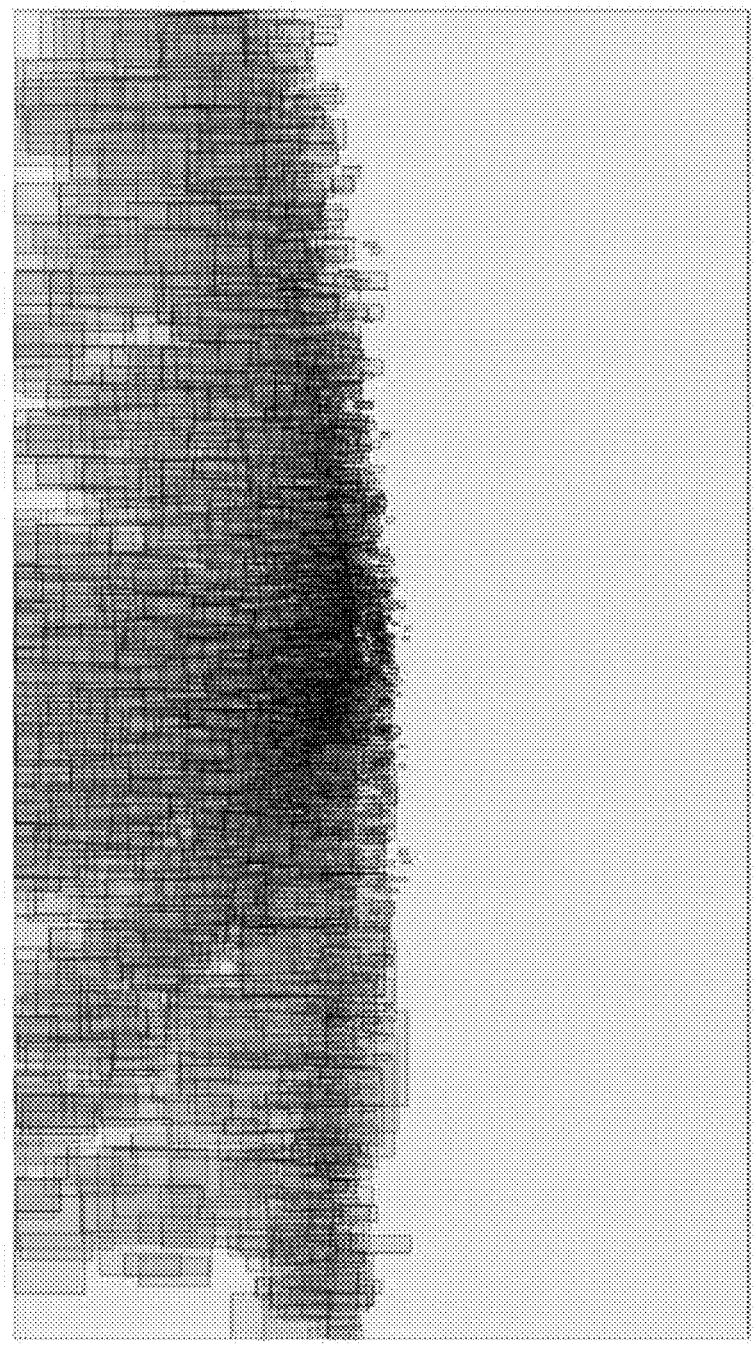
FIG. 6B is an example of a data distribution of locations of traffic light image objects in a training image set.

FIG. 6A is an example 600A of a detectability map 122 for the SSD traffic light detector 114 (TD2). FIG. 6B is an example 600B of a data distribution of locations of traffic light image objects 118 in a training image set. FIG. 6C is an example 600C of a detectability map 122 for the Faster R-CNN traffic light detector 114 (TD3). As a third pitfall, it was identified that the SSD detector 114 is location invariant, while the Faster R-CNN detector 114 is not. Detectability maps 122 of the three detectors TD1, TD2, and TD3 were computed on a blank scene using image object 118 overlays of various sizes. A purpose of computing these detectability maps 122 is to identify whether or not the overlay location impacts detectability, effectively verifying the location invariance of the detectors 114. As noted above, the example 600A depicts a detectability map 122 computed for TD2, while the example 600C depicts a detectability map 122 computed for TD3. Both detectors 114 were trained on the same dataset for consistency. The spatial distribution of all traffic light image objects 118 in this set is also depicted. Except for some recurring patterns, it is evident that TD2 computes more uniform scores than TD3. The TD3 detector 114 uses Faster R-CNN, which, according to the detection maps 122, favors locations closer to the training set distribution as shown in the example 600B. On the other hand, TD2 uses an SSD detector 114 that ensures translation invariance by design. The examples 600A and 600C also reveal that the SSD detector 114 can detect image object 118 overlays right next to the image boundaries, while the Faster R-CNN detector 114 cannot.

A noticeable gap appears in the top part of the map computed for TD2, in which detection by the model 114 seems to be hindered completely. To confirm this, one traffic light instance was tested from BSTLD that lies within the gap region in its scene. This instance was indeed undetected by TD2. However, shifting the scene image up and down makes the instance detectable with a high detection score 120 if the traffic light is instead overlaid outside the gap. This suggests a malfunction in TD2, as the same behavior does not appear with the other detectors 114. By testing multiple image object 118 overlays, it can be confirmed that TD2 produces the gap only when an image object 118 overlay is used to compute the detectability map 122. The gap disappears when a larger overlay is used (as shown in the example 200 above) whose detectability map 122 is computed using TD2 as well. This suggests a numerical issue in routing low-level features in TD2. An SSD relies on these features for capturing small image objects 118, as they have appropriate receptive fields. This malfunction does not happen with TD1, which is also an SSD detector 114, nor with the base TensorFlow SSD model 114 which TD2 fine-tunes. Thus, it is also recommended that a model developer test the detectability of image objects 118 at all possible background image 116 locations.

Regarding the applicability and limitations of the described techniques, the focus is on exposing systematic pitfalls of a detector 114, not on generating realistic scenes. For example, when analyzing traffic light detectors, traffic light image objects 118 were superimposed without a pole or a cable, and often were placed at odds with the existing background image 116. The findings enabled by the disclosed approaches are not impacted by this limitation, due to factors, such as (i) focusing on repetitive patterns that emerge from a collection of test cases (CO), (ii) linking the patterns found with corresponding real cases (Ct2), and (iii) involving the human expert in the loop by means of an interactive visualization to make sense of these patterns, and to verify them on real scenes via systematic means.

The described approaches are model-agnostic, making them applicable to a variety of detection models 114. On the other hand, the described approaches do not provide information on model activations nor on how they affect the detection results, unlike Haggles (C. Vondrick, A. Khosla, T. Malisiewicz, and A. Torralba. "Hoggles: Visualizing object detection features," *IEEE International Conference on Computer Vision (ICCV)*, pages 1-8, 2013) or DeepXplore (K. Pei, Y. Cao, J. Yang, and S. Jana, "DeepXplore: Automated whitebox testing of deep learning systems." *Symposium on Operating Systems Principles*, pages 1-18. ACM, 2017). Likewise, a focus is on analyzing false negatives, with limited possibilities to analyze false positives. Finally, the detectability maps 122 presented are coarse and often look pixelated. This is aggravated by the behavior of detection models 114 as shown in the examples 600A, 600B, and 600C. To reduce this effect in actual scenes, an option may be offered to normalize their detectability maps 122 by the one computed for a blank scene with the same overlay. More advanced methods, such as splatting, may be useful to synthesize smoother maps using a small stride when computing the scores.

These insights may be valuable in the identification of similar issues in various models 114 that are being developed for use in production systems. The described visualizations, accordingly, provide insights into AI models 114, convey the essence of training and testing data, increase confidence in AI models 114 by expanding the test coverage, and reduce development time by guiding model 114 improvements and by informing the collection of additional data.

Figure 7:
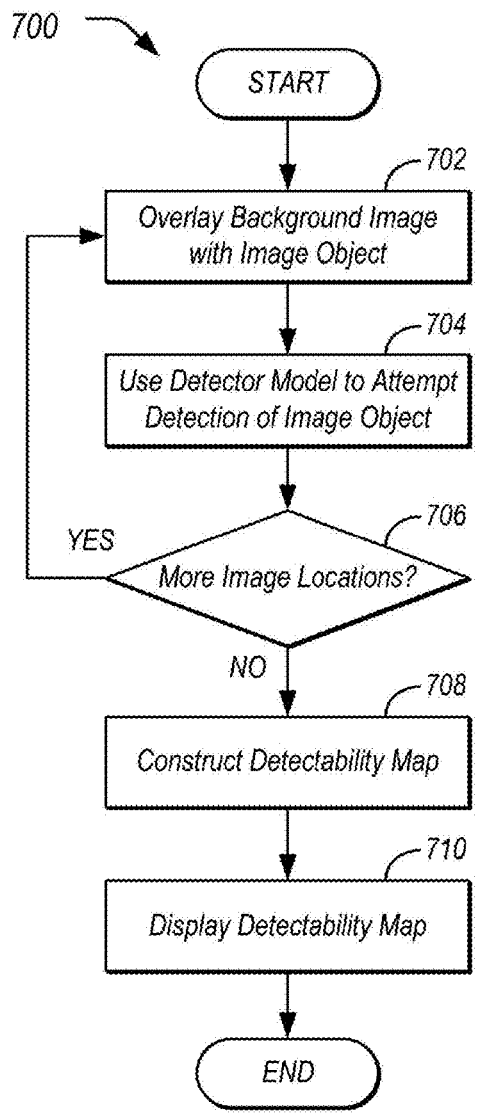
FIG. 7 is an example method for generation of a detectability map.

FIG. 7 is an example method 700 for generation of a detectability map 122. In an example, the method 700 may be performed by the system 100, as discussed in detail herein. For instance, the operations described herein may be controlled by the processor 102 executing the mapping application 112 in the context of the system 100.

At operation 702, the system 100 overlays a background image 116 with an image object 118. In an example, the processor 102 of the system 100 superimposes the image object 118, e.g., from a listing of overlays 202 as shown in FIG. 2, into the background image 116 using image superimposition techniques. The background image 116 may be a user-supplied image or may be from a set of images having certain background elements. In some cases, the system 110 may perform the process 700 using many images in various categories to identify subject matter in the background images 116 that is affecting detection of the superimposed image objects 118.

At operation 704, the system 100 uses the detector model 114 to attempt to detect the image object 118 in the background image 116. In an example, the processor 102 of the system 100 runs the detector model 114 on the image with the superimposed image object 118. The detector model 114 may have been trained to identify the image object 118 in background images 116, where the detection results in a background scene detection score 120 indicative of a likelihood of the image object 118 being detected at the location in the background image 116.

At operation 706, the system 100 determines whether to overlay the image object 118 at additional locations over the background image 116. In an example, the processor 102 of the system 100 may iteratively move the location for the image overlay 118 as a sliding window to cover the whole background image 116. The detector 114 may be executed at each location and a detection score 120 may be recorded at each location. For efficient computation, in some examples the overlay dimensions may be used as the horizontal and vertical strides. The computation efficiency can be further improved by evaluating the detection score 120 at multiple locations in one run. For instance, the model 114 may be used to determine detection scores 120 for multiple image objects 118 in a single background image 116. If additional locations remain, control passes to operation 702 to overlay and detect the image object 118 at the additional locations. If all locations have been covered, control proceeds to operation 708.

At operation 708, the system 100 constructs a detectability map 122. In an example, the processor 102 of the system 100 may utilize the detection scores 120 computed for the overlay of the image object 118 at the multiple locations in the background image 116 to expose the effect of the content of the background image 116 on detectability of the overlaid image object 118. To visualize this effect, the processor 102 may draw a box over each location in the image 116 and may color the box according to the computed detection score 120. The resulting image mask of these boxes may be referred to as a detectability map 122. Two modes may be provided to color the boxes of the detectability map 122, namely showing detected locations, and showing undetected locations.

At operation 710, the system 100 displays the detectability map 122. In an example, the processor 102 may display the detectability map 112 to the display device 106. After operation 710, the process 700 ends.

In sum, using image superimposition, image object 118 instances may be superimposed against a variety of background areas 116. This enables identifying certain background features or scene objects that interfere with the detection model 114. Accordingly, shortcomings in detectors 114 may be identified that could hinder the detection in the presence of certain scene objects due to previously-unknown model 114 pitfalls. Understanding these weaknesses and shortcomings is vital in various environments, such as for autonomous driving, as autonomous driving makes extensive use of image object 118 detection. The described approaches provide guidance on how to mitigate these issues, either via data augmentation or by refining the model parameters, and offer new approaches to elevate test coverage and model reliability.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A method for exposing weaknesses in image object detectors, comprising:
    overlaying an image object onto a background image at each of a plurality of locations, the background image including a scene in which the image objects can be present;
    using a detector model to attempt detection of the image object as overlaid onto the background image, the detector model being trained to identify the image object in background images, the detection resulting in background scene detection scores indicative of likelihood of the image object being detected at each of the plurality of locations; and
    displaying a detectability map overlaid on the background image, the detectability map including, for each of the plurality of locations, a bounding box of the image object illustrated according to the respective detection score.

2. The method of claim 1, further comprising:
    comparing the detection scores to an adjustable detection threshold; and
    shading the bounding boxes for locations in which the detection score for the image object exceeds the adjustable detection threshold.

3. The method of claim 1, further comprising:
    comparing the detection scores to an adjustable detection threshold; and
    shading the bounding boxes for locations in which the detection score for the image object does not exceed the adjustable detection threshold.

4. The method of claim 1, further comprising utilizing a sliding window with a horizontal stride set to a width of the image object, and a vertical stride set to a height of the image object, wherein the sliding window is set to cover the entire background image.

5. The method of claim 1, wherein the image object is overlaid at more than one of the plurality of locations in a single background image such that multiple detection scores are identified in the single background image.

6. The method of claim 1, further comprising:
    overlaying the image object onto a second background image at each of the plurality of locations;
    using the detector model to attempt detection of the image object as overlaid onto the second background image, the detection resulting in second scene detection scores indicative of likelihood of the image object being detected at each of the plurality of locations; and
    constructing a second detectability map using the second scene detection scores.

7. The method of claim 1, wherein the background image is first road scene, the second background image is a second road scene, and the image object is a traffic light image.

8. The method of claim 1, wherein the second background image is a blank image.

9. A system for exposing weaknesses in image object detectors, comprising:
    a user interface;
    a storage configured to maintain a background image, an image object, and a mapping application; and
    a processor, in communication with the storage and the user interface, programmed to execute the mapping application to perform operations including to:
        overlay the image object onto the background image at each of a plurality of locations, the background image including a scene in which the image objects can be present;
        use a detector model to attempt detection of the image object as overlaid onto the background image, the detector model being trained to identify the image object in background images, the detection resulting in background scene detection scores indicative of likelihood of the image object being detected at each of the plurality of locations; and
        display, in the user interface, a detectability map overlaid on the background image, the detectability map including, for each of the plurality of locations, a bounding box of the image object illustrated according to the respective detection score.

10. The system of claim 9, wherein the processor is further programmed to execute the mapping application to perform operations including to:
    compare the detection scores to an adjustable detection threshold; and
    shade the bounding boxes for locations in which the detection score for the image object exceeds the adjustable detection threshold.

11. The system of claim 9, wherein the processor is further programmed to execute the mapping application to perform operations including to:
    compare the detection scores to an adjustable detection threshold; and
    shade the bounding boxes for locations in which the detection score for the image object does not exceed the adjustable detection threshold.

12. The system of claim 9, wherein the processor is further programmed to execute the mapping application to perform operations including to utilize a sliding window with a horizontal stride set to a width of the image object, and a vertical stride set to a height of the image object, wherein the sliding window is set to cover the entire background image.

13. The system of claim 9, wherein the image object is overlaid at more than one of the plurality of locations in a single background image such that multiple detection scores are identified in the single background image.

14. The system of claim 9, wherein the processor is further programmed to execute the mapping application to perform operations including to:
    overlay the image object onto a second background image at each of the plurality of locations;
    use the detector model to attempt detection of the image object as overlaid onto the second background image, the detection resulting in second scene detection scores indicative of likelihood of the image object being detected at each of the plurality of locations; and construct a second detectability map using the second scene detection scores for use in identifying one or more differences in detection between the detectability map and the second detectability map.

15. A non-transitory computer-readable medium comprising instructions that, when executed by a processor, cause the processor to perform operations for exposing weaknesses in image object detectors including to:

overlay an image object onto a background image at each of a plurality of locations, the background image including a scene in which the image objects can be present;

use a detector model to attempt detection of the image object as overlaid onto the background image, the detector model being trained to identify the image object in background images, the detection resulting in background scene detection scores indicative of likelihood of the image object being detected at each of the plurality of locations; and display, in a user interface, a detectability map overlaid on the background image, the detectability map including, for each of the plurality of locations, a bounding box of the image object illustrated according to the respective detection score.

16. The medium of claim 15, wherein the instructions further cause the processor to perform operations including to:

compare the detection scores to an adjustable detection threshold; and shade the bounding boxes for locations in which the detection score for the image object exceeds the adjustable detection threshold.

17. The medium of claim 15, wherein the instructions further cause the processor to perform operations including to:

compare the detection scores to an adjustable detection threshold; and shade the bounding boxes for locations in which the detection score for the image object does not exceed the adjustable detection threshold.

18. The medium of claim 15, wherein the instructions further cause the processor to perform operations including to utilize a sliding window with a horizontal stride set to a width of the image object, and a vertical stride set to a height of the image object, wherein the sliding window is set to cover the entire background image.

19. The medium of claim 15, wherein the image object is overlaid at more than one of the plurality of locations in a single background image such that multiple detection scores are identified in the single background image.

20. The medium of claim 15, wherein the instructions further cause the processor to perform operations including to:

overlay the image object onto a second background image at each of the plurality of locations;

use the detector model to attempt detection of the image object as overlaid onto the second background image, the detection resulting in second scene detection scores indicative of likelihood of the image object being detected at each of the plurality of locations; and construct a second detectability map using the second scene detection scores.

* * * * *